United States Patent
Gregg et al.

(10) Patent No.: US 11,650,367 B2
(45) Date of Patent: May 16, 2023

(54) GRADED-INDEX FIBERS AND PHASE ELEMENTS FOR IN-FIBER BEAM SHAPING AND SWITCHING

(71) Applicant: Lumentum Operations LLC, San Jose, CA (US)

(72) Inventors: Patrick Gregg, Santa Clara, CA (US); Martin H. Muendel, Oakland, CA (US); Richard D. Faulhaber, San Carlos, CA (US)

(73) Assignee: Lumentum Operations LLC, San Jose, CA (US)

( * ) Notice: Subject to any disclaimer, the term of this patent is extended or adjusted under 35 U.S.C. 154(b) by 365 days.

(21) Appl. No.: 16/853,469

(22) Filed: Apr. 20, 2020

(65) Prior Publication Data

US 2021/0223467 A1 Jul. 22, 2021

Related U.S. Application Data

(60) Provisional application No. 62/963,837, filed on Jan. 21, 2020.

(51) Int. Cl.
| | |
|---|---|
| *G02B 6/028* | (2006.01) |
| *G02B 6/32* | (2006.01) |
| *G02B 6/26* | (2006.01) |
| *B23K 26/06* | (2014.01) |

(52) U.S. Cl.
CPC .......... *G02B 6/0281* (2013.01); *G02B 6/262* (2013.01); *G02B 6/32* (2013.01); *B23K 26/0648* (2013.01)

(58) Field of Classification Search
CPC ...... G02B 6/028; G02B 6/0281; G02B 6/262; G02B 6/32; G02B 6/264; G02B 27/0994; G02B 27/0927; G02B 27/286; B23K 26/0648; B23K 26/064
See application file for complete search history.

(56) References Cited

U.S. PATENT DOCUMENTS

| | | | | |
|---|---|---|---|---|
| 5,076,672 A | * | 12/1991 | Tsuda | G02F 3/00 |
| | | | | 359/244 |
| 5,748,392 A | * | 5/1998 | Hamada | G01R 15/242 |
| | | | | 359/819 |
| 6,437,885 B1 | * | 8/2002 | Duncan | G02B 6/4214 |
| | | | | 359/283 |
| 6,574,015 B1 | * | 6/2003 | Tselikov | G02B 6/272 |
| 9,250,390 B2 | | 2/2016 | Muendel et al. | |
| 2010/0245974 A1 | * | 9/2010 | Pan | G02B 6/29358 |
| | | | | 385/38 |
| 2013/0331689 A1 | * | 12/2013 | Le | G02B 6/3624 |
| | | | | 385/33 |

* cited by examiner

*Primary Examiner* — Michael P Mooney
(74) *Attorney, Agent, or Firm* — Harrity & Harrity, LLP (57) ABSTRACT

An optical device may include a fiber to provide a beam. The optical device may include a graded-index element to expand or magnify the beam. An input facet of the graded-index element may be adhered to an output facet of the fiber. The optical device may include an optical transformation element to transform the beam after the beam is expanded or magnified by the graded-index element. An input facet of the optical transformation element may be adhered to an output facet of the graded-index element.

20 Claims, 8 Drawing Sheets

FIG. 6

GRADED-INDEX FIBERS AND PHASE ELEMENTS FOR IN-FIBER BEAM SHAPING AND SWITCHING

RELATED APPLICATION

This application claims priority to U.S. Provisional Patent Application No. 62/963,837, filed on Jan. 21, 2020, the content of which is incorporated by reference herein in its entirety.

TECHNICAL FIELD

The present disclosure relates to optical fibers and, more particularly, to graded-index optical fibers and phase elements for in-fiber beam shaping and switching.

BACKGROUND

Beam shaping (e.g., for cutting, welding, or the like) is an increasingly important aspect of the high-power (e.g., greater than 100 watts (W)) laser material processing field and, therefore, a laser system with beam shaping capabilities may be desirable. Conventional beam shaping methods involve selectively exciting different guiding regions of an optical fiber by either turning different lasers on and off, moving a laser beam (e.g., in free space or in fiber), or making use of custom free-space optical elements (e.g., axicons).

Another technique for beam shaping is to use an optical transformation element that imposes a phase on a beam (e.g., as the beam travels through the optical transformation element). Such an optical transformation element can be seen as tailoring the near field of an optical field by imposing a particular phase profile. It may be beneficial to use such optical transformation elements to perform beam shaping, for example, either after a delivery fiber inside a cutting head or after a first optical fiber and before a second optical fiber. This could be realized by, for example, arranging the optical transformation element to impose a phase only as the beam goes from a first optical fiber to a second optical fiber, or by arranging the optical transformation element to impose a phase and arranging a lens to perform an optical Fourier transform (which would change both intensity and phase) as the beam goes from the first optical fiber to the second optical fiber. Notably, in either case, further beam transformation can be implemented on a downstream end of the second optical fiber using, for example, a graded-index fiber lens.

SUMMARY

According to some possible implementations, an optical device may include a fiber to provide a beam; a graded-index element to expand or magnify the beam, wherein an input facet of the graded-index element is adhered to an output facet of the fiber; and an optical transformation element to transform the beam after the beam is expanded or magnified by the graded-index element, wherein an input facet of the optical transformation element is adhered to an output facet of the graded-index element. In some implementations, the graded-index element is a first graded-index element, and the optical device further includes a second graded-index element to manipulate the beam after the beam is transformed by the optical transformation element (e.g., for resizing the beam into a delivery fiber), wherein an input facet of the second graded-index element is adhered to an output facet of the optical transformation element.

According to some possible implementations, an optical system may include an optical fiber device, including a set of graded-index fibers associated with expanding or magnifying a beam provided by an input fiber, wherein an input facet of a first graded-index fiber, of the set of graded-index fibers, is adhered to an output facet of the input fiber; and an optical transformation element associated with transforming the beam after expanding or magnifying by the first graded-index fiber, wherein an input facet of the optical transformation element is adhered to an output facet of a particular graded-index fiber of the set of graded-index fibers. In some implementations, the set of graded-index fibers includes a second graded-index fiber (e.g., for resizing the beam into a delivery fiber), wherein an input facet of the second graded-index fiber is adhered to an output facet of the optical transformation element.

According to some possible implementations, a method may include providing a beam to be transformed, the beam being provided by a fiber included in an optical device, expanding or magnifying the beam, the beam being expanded or magnified by a graded-index element included in the optical device, wherein an input facet of the graded-index element is adhered to an output facet of the fiber; and transforming the beam after the expanding or magnifying of the beam, the beam being transformed by an optical transformation element included in the optical device, wherein an input facet of the optical transformation element is adhered to an output facet of the graded-index element. In some implementations, the graded-index element is a first graded-index element, and the method further includes manipulating, by a second graded-index element, the beam after the transforming of the beam by the optical transformation element (e.g., for resizing the beam into a delivery fiber), wherein an input facet of the second graded-index element is adhered to an output facet of the optical transformation element.

DETAILED DESCRIPTION

The following detailed description of example implementations refers to the accompanying drawings. The same reference numbers in different drawings may identify the same or similar elements.

While an optical transformation element could be implemented using free-space optics according to the technique described above, it is preferable (e.g., for reasons of cost, performance, and reliability) to create a monolithic, integrated structure where light does not exit into free-space. However, such an optical transformation element is difficult to directly integrate with optical fibers (i.e., writing an efficient optical transformation element on a fiber tip or directly splicing an optical transformation element onto an optical fiber is difficult, especially if in-fiber beam delivery after the transformation element is required).

One reason that integration of an optical transformation element with an optical fiber is difficult is that many optical transformation elements are based on material systems which can have poor adhesion to fused silica and limited optical power handling, such as polymers. Moreover, these optical transformation elements have topological features (e.g., where a phase profile is controlled by writing nano-scale or micro-scale features on a surface of the optical transformation element) that are difficult or impossible to sandwich between a first optical fiber and a second optical fiber, both because such topological features are non-planar (and, thus, do not make flush contact with one of the optical fibers) and because such topological features can be damaged or destroyed by the heat of a splice process used to attach the optical transformation element to either the first or second optical fiber.

Another reason that integration of an optical transformation element with an optical fiber is difficult is that for some optical fibers (e.g., optical fibers used in industrial applications) a guiding region of the optical fiber where light is confined is relatively small (e.g., on the order of approximately 100 to 200 microns (μm) or less). However, an achievable feature scale for most optical transformation elements is on the order of single microns to tens of microns, meaning that the complexity of a pattern that can be written on an optical transformation element is limited. As a result, an achievable pattern may be inefficient (e.g., due to a low spatial resolution relative to a beam size), leading to undesired beam shapes and/or loss due to low diffraction efficiency, which may be unacceptable in a high-power laser system. For example, to manufacture a blazed phase grating with 95% efficiency, at least eight phase levels per period are required, which drastically restricts available deflection angles if such a blazed phase grating is made on a standard fiber tip.

Some implementations described herein provide an optical device that includes graded-index (GRIN) optical fibers and one or more optical transformation elements (e.g., one or more planarized glass-based optical metamaterials and/or one or more diffractive optical elements), where the one or more optical transformation elements are spliced or otherwise bonded onto the GRIN fibers. In some implementations, use of GRIN optical fibers in conjunction with one or more optical transformation elements enables the optical device to provide tailoring of the near and/or far fields of an optical fiber. A technique for manufacturing such an optical transformation element so that the optical transformation element is splice-able to optical fibers is also described below. Further, example implementations are described illustrating use of such an optical device to enable variable beam shaping or switching in an all-fiber system.

Figure 1A:
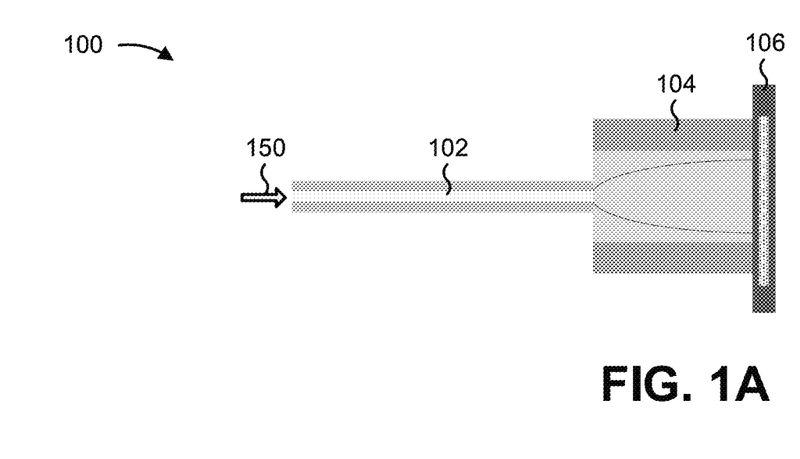
FIGS. 1A, 1B, 2A and 2B are diagrams illustrating examples of optical devices including one or more GRIN elements and one or more optical transformation elements, as described herein.
Figure 1B:
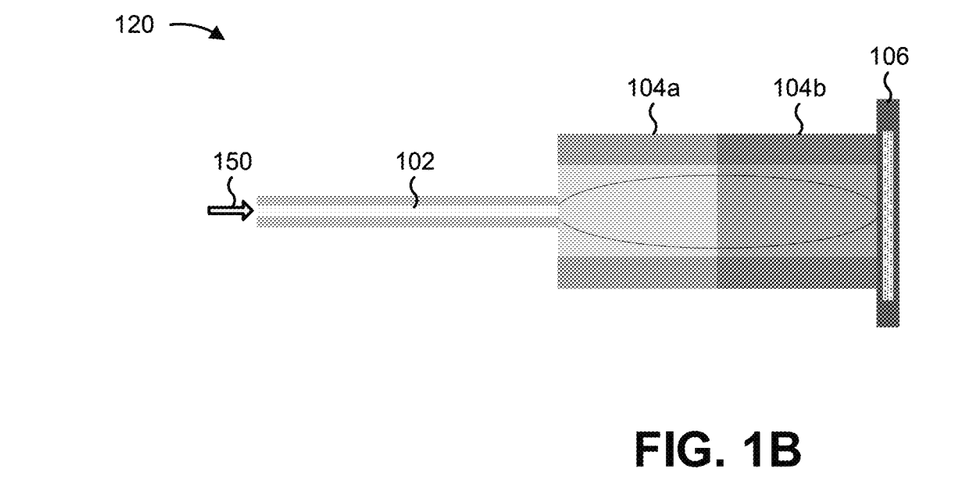

FIGS. 1A and 1B are diagrams illustrating examples of an optical device 100 and an optical device 120, respectively. As described below, optical devices 100 and 120 include an optical transformation element, adhered to a GRIN fiber, that provides tailoring of the near and/or far fields of the optical fiber. As shown in FIGS. 1A and 1B, in some implementations, optical devices 100 and 120 may include a fiber 102, a GRIN element 104, and an optical transformation element 106.

Fiber 102 includes an optical fiber to provide a beam 150. In some implementations, fiber 102 may be coupled to a light source (e.g., a laser) that launches light into fiber 102 (e.g., via an input facet of fiber 102). In some implementations, fiber 102 may be a step-index optical fiber. In some implementations, as shown in FIGS. 1A and 1B, an output facet of fiber 102 (e.g., a right end of fiber 102 in FIGS. 1A and 1B) may be adhered (e.g., spliced, bonded, or the like) to an input facet of a GRIN element 104 (e.g., such that beam 150 can be provided to the GRIN element 104 by fiber 102).

GRIN element 104 includes a GRIN element to expand or magnify beam 150. In some implementations, GRIN element 104 may include one or more GRIN fibers. In some implementations, an input facet of GRIN element 104 may be adhered to the output facet of fiber 102, and an output facet of GRIN element 104 may be adhered to an input facet of optical transformation element 106. For example, as shown in optical device 100 of FIG. 1A, GRIN element 104 may include a single quarter-pitch GRIN fiber, in some implementations. Here, an input facet of the single quarter-pitch GRIN fiber (e.g., a left end of GRIN element 104) may be adhered to the output facet of fiber 102, and output facet of the single quarter-pitch GRIN fiber (e.g., a right end of GRIN element 104) may be adhered to an input facet of optical transformation element 106. As another example, as shown in optical device 120 of FIG. 1B, GRIN element 104 may include a GRIN telescope comprising a first quarter-pitch GRIN fiber (e.g., GRIN element 104a) and a second quarter-pitch GRIN fiber (e.g., GRIN element 104b), in some implementations. Here, an input facet of the GRIN telescope may be adhered to the output facet of fiber 102, and an output facet of the GRIN telescope may be adhered to an input facet of optical transformation element 106. Additional details regarding GRIN element 104 are described below.

Optical transformation element 106 includes an element to transform beam 150 after beam 150 is expanded or magnified by GRIN element 104. In some implementations, optical transformation element 106 may comprise a glass-based optical metamaterial, a polymer-based material, one or more diffractive optical elements, one or more refractive optical elements, or the like. In some implementations, optical transformation element 106 may be birefringent such that orthogonal polarizations of beam 150 experience distinct transformations as beam 150 passes through optical transformation element 106. In some implementations, an input facet of optical transformation element 106 may be adhered to the output facet of GRIN element 104. Additional details regarding optical transformation element 106 are described below.

In some implementations, to achieve acceptable adherence (e.g., splicing or bonding) of optical transformation element 106 to a GRIN element 104, optical transformation element 106 may be planarized, as described in further detail below with respect to FIGS. 3A-3C. In some implementations, optical transformation element 106 may include a non-planar surface associated with transforming beam 150, a planarization layer on the non-planar surface, and a bulk optical material adhered to the planarization layer. In some implementations, planarizing optical transformation element 106 may enable structural-quality and low-loss bonding to be achieved. In some implementations, a thickness of the planarization layer of optical transformation element 106 may be designed to prevent heat of an adhering process (e.g., a splice process) from damaging features of optical transformation element 106.

In some implementations, lateral alignment between GRIN element 104 and optical transformation element 106 may or may not be needed when adhering GRIN element 104 to optical transformation element. For example, lateral alignment between GRIN element 104 and an optical transformation element 106 designed as a vortex phase plate or a lens is needed when adhering GRIN element 104 and optical transformation element 106 (e.g., to ensure acceptable performance of the vortex phase plate). Conversely, lateral alignment between GRIN element 104 and an optical transformation element 106 designed as a beam splitter may not need to be tightly controlled when adhering GRIN element 104 and optical transformation element 106. However, in an optical device in which optical transformation element 106 is sandwiched between a first GRIN element 104 and a second GRIN element 104 (examples of which are described below) lateral alignment between the first and second GRIN elements 104 (i.e., fiber-to-fiber alignment) should be provided.

In general, GRIN fibers have lensing properties that enable design of an optical device or an optical system (e.g., optical device 100, optical device 120, other optical devices described herein, or the like) that can manipulate a near field and/or a far field intensity of an optical fiber. These lensing properties include (1) the use of a quarter-pitch GRIN fiber being equivalent to using a lens to make an optical Fourier transform, where a focal length of the lens is determined by a refractive-index profile of the GRIN fiber, and (2) the use of a half-pitch GRIN lens (or GRIN lens system) being equivalent to using a lens (or lens system) to perform an imaging operation. The use of these lensing properties also resolves the above-described challenge associated with integrating optical fibers and optical transformation elements. For example, using a quarter-pitch GRIN fiber (e.g., as in optical device 100 of FIG. 1A) or a GRIN telescope (e.g., as in optical device 120 of FIG. 1B) with a magnification greater than 1 between fiber 102 and optical transformation element 106 can increase a size of beam 150 relative to features of optical transformation element 106, and thereby increase diffraction efficiency.

In optical device 120 of FIG. 1B, the goal is to increase a size of beam 150 provided by fiber 102 so that a spot size on optical transformation element 106 is increased. In optical device 120, the spot size of beam 150 is increased by a factor of M (e.g., M=f2/f1, where f2 is a focal length of GRIN element 104$b$ and f1 is a focal length of GRIN element 104$a$). Here, to achieve magnification (e.g., M>1), the focal length f2 should be greater than the focal length f1. A focal length f of a given GRIN fiber (e.g., GRIN element 104$a$ or GRIN element 104$b$) is based on a core size (e.g., a radius r) of the given GRIN fiber and a numerical aperture NA of the given GRIN fiber (e.g., f=r/NA). Further, a quarter-pitch length QPL of the given GRIN fiber is based on the focal length f and a peak index of refraction n of the given GRIN fiber (e.g., QPL=$\pi \times n \times f/2$). Thus, a length of a given GRIN fiber is proportional to a focal length f and, when f2>f1 (e.g., as in the case of optical device 120), a length of GRIN element 104$b$ is greater than a length of GRIN element 104$a$. In some implementations, when GRIN element 104$a$ and GRIN element 104$b$ have the same NA, a ratio of the length of GRIN element 104$b$ to a length of GRIN element 104$a$ is also a magnification provided by GRIN element 104. In some implementations, the ratio of the length of GRIN element 104$b$ to the length of GRIN element 104$a$ may be in a range from approximately 2:1 to approximately 5:1 (e.g., depending upon the application).

The number and arrangement of elements shown in FIGS. 1A and 1B are provided as examples. In practice, optical device 100 or optical device 120 may include additional elements, fewer elements, different elements, or differently arranged elements than those shown in FIGS. 1A and 1B. Additionally, or alternatively, a set of elements (e.g., one or more elements) of optical device 100 or optical device 120 may perform one or more functions described as being performed by another set of elements of optical device 100 or optical device 120.

Figure 2A:
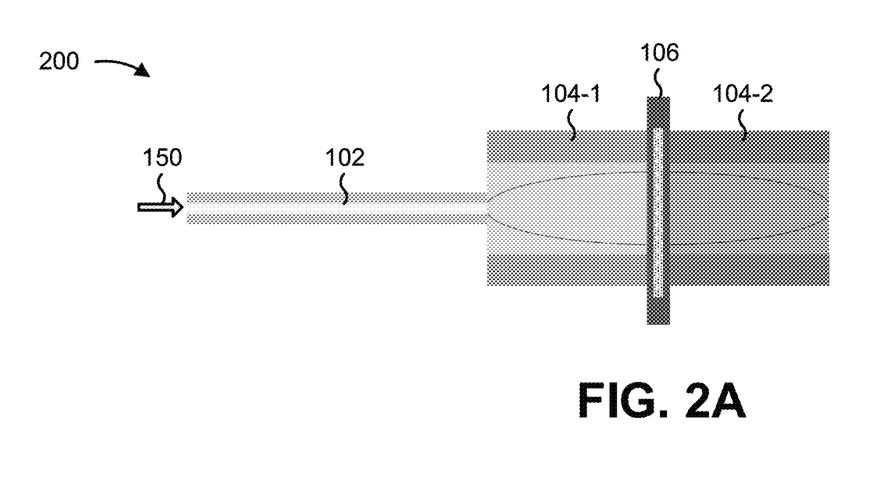
Figure 2B:
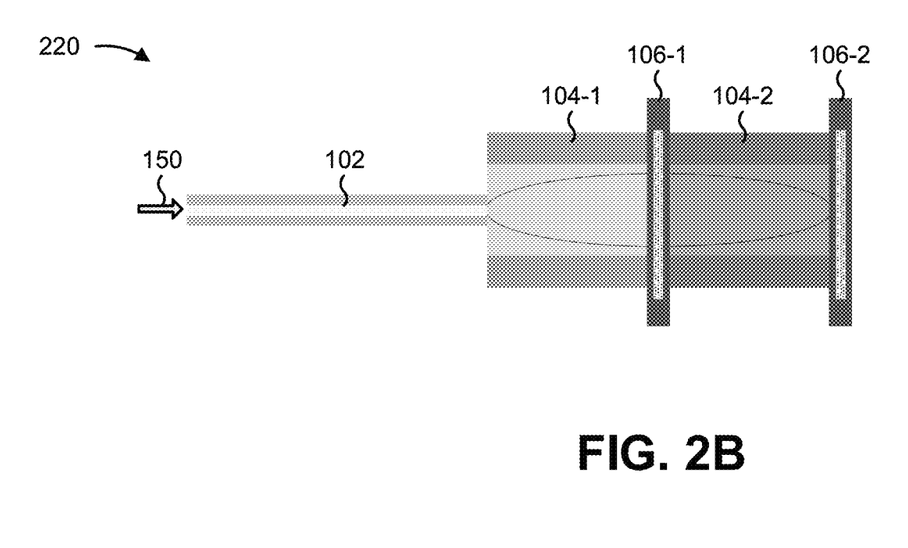

In some implementations, the Fourier transforming and imaging properties of GRIN lenses described above enable GRIN elements 104 and one or more optical transformation elements 106 to be used to tailor a beam shape of beam 150 (e.g., in the near field and/or the far field). FIGS. 2A and 2B are diagrams illustrating examples of optical devices 200 and 220, respectively, including GRIN elements 104 and one or more optical transformation elements 106 that can be used to tailor a beam shape of beam 150.

As shown in FIG. 2A, optical device 200 may include a first GRIN element 104 (e.g., GRIN element 104-1) and a second GRIN element 104 (e.g., GRIN element 104-2). In some implementations, an input facet of second GRIN element 104 is adhered to an output facet of optical transformation element 106, as shown in FIG. 2A. In some implementations, the second GRIN element 104 may be arranged to manipulate beam 150 after beam 150 is transformed by optical transformation element 106. For example, in operation of optical device 200, a near field of fiber 102 is expanded by GRIN element 104-1 (e.g., a quarter-pitch GRIN fiber), experiences a designed phase from optical transformation element 106, and is then Fourier transformed by GRIN element 104-2. As a result, intensity distribution of beam 150 may be changed at an end of GRIN element 104-2 (according to the initial beam 150 and the designed phase of optical transformation element 106).

As shown in FIG. 2B, optical device 220 may include a first GRIN element 104 (e.g., GRIN element 104-1) and a second GRIN element (e.g., GRIN element 104-2), a first optical transformation element 106 (e.g., optical transformation element 106-1) and a second optical transformation element 106 (e.g., optical transformation element 106-2). In some implementations, an input facet of second GRIN element 104 is adhered to an output facet of the first optical transformation element 106, and an input facet of the second optical transformation element 106 is adhered to an output facet of the second GRIN element 104, as shown in FIG. 2B. Here, the second optical transformation element 106 may transform beam 150 after beam 150 is manipulated by the second GRIN element 104. For example, in operation of optical device 220, beam 150 is expanded by the first GRIN element 104 (e.g., a quarter-pitch GRIN fiber), experiences a designed phase from the first optical transformation element 106, is Fourier transformed by second GRIN element 104 (e.g., a quarter-pitch GRIN fiber, which may have a different focal length than the first GRIN element 104), and then experiences the second optical transformation element 106. This combination of elements enables control over both the near field distribution and the far field distribution leaving the second optical transformation element 106. Notably, two optical transformation elements 106 with a Fourier transformation between them enables arbitrary intensity and phase reshaping.

In some implementations, for both optical device 200 and optical device 220, a resulting optical field could be relayed into a cutting head, coupled into a second delivery fiber, or the like. In some implementations, in optical device 220, a target fiber could be adhered (e.g., spliced) to an output facet of the second GRIN element 104. In some implementations, in optical device 220, a target fiber could be adhered (e.g., spliced or bonded) to an output facet of the second optical transformation element 106, or the second optical transformation element 106 could be followed by another GRIN element 104 (e.g., to resize the beam), in some cases.

Notably, while the first and second GRIN elements 104 in optical devices 200 and 220 do not have the same focal lengths, the focal lengths of the first and second GRIN elements 104 could be the same, in some implementations (e.g., an optimal size ratio may depend on the application).

The number and arrangement of elements shown in FIGS. 2A and 2B are provided as examples. In practice, optical device 200 or optical device 220 may include additional elements, fewer elements, different elements, or differently arranged elements than those shown in FIGS. 2A and 2B. In particular, it may be beneficial to include more optical transformation elements 106 with quarter-pitch GRIN fiber elements between them in order to enact complicated phase transformations that are not possible to implement with only two elements, or which would require prohibitively complicated optical transformation elements. Additionally, or alternatively, a set of elements (e.g., one or more elements) of optical device 200 or optical device 220 may perform one or more functions described as being performed by another set of elements of optical device 200 or optical device 220.

In some implementations, to resolve the challenge of directly adhering optical transformation element 106 to a fiber (e.g., GRIN element 104), optical transformation element 106 may be a planarized element on a glass (e.g., fused silica, doped fused silica, fused quartz, soft glass or the like) material architecture. Such an approach may be applicable to many varieties of optical transformation elements 106, such as an optical transformation element 106 including a structure that is a lithographically defined structure created in a standard growth-etch process (so long as planarization is possible), a structure that is a laser-ablation based material deformation within a bulk material, a structure that is isotropic and has a same phase effect regardless of polarization (i.e., by making circularly symmetric features), or a structure that is anisotropic and has different effects depending on an input polarization, enabling Pancharatnam-Berry phase elements. Such optical transformation elements 106 may be known by many names and come in many variations, including but not limited to: optical metamaterials, optical kinoforms, binary optics, multi-level diffractive optics, or the like.

Figure 3A:
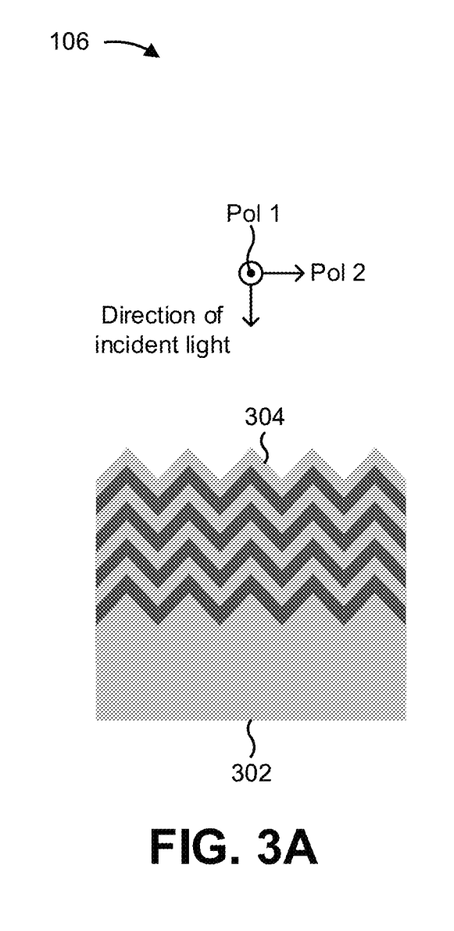
FIGS. 3A-3C are diagrams illustrating examples associated with fabricating an optical transformation element as a planarized element on a glass material architecture.
Figure 3B:
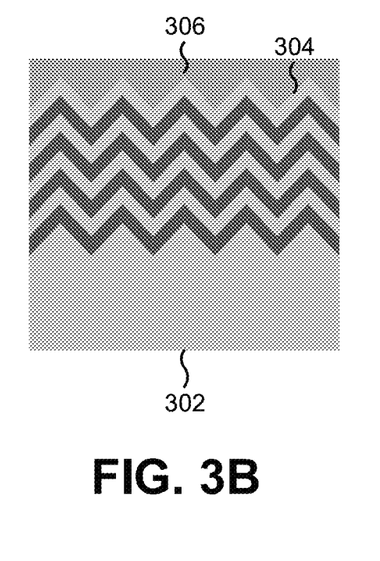
Figure 3C:
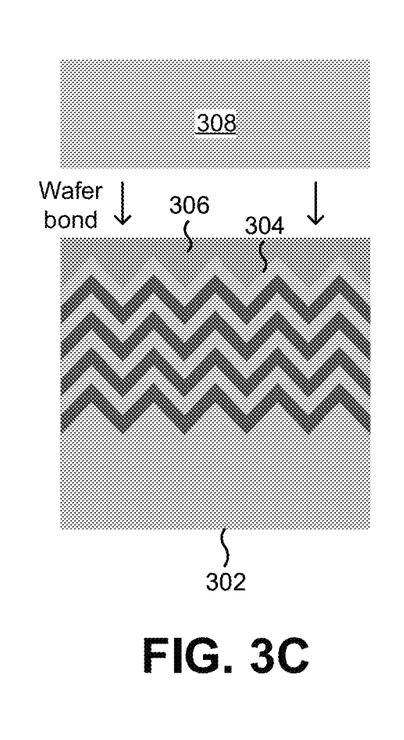

FIGS. 3A-3C are diagrams illustrating examples associated with fabricating optical transformation element 106 as a planarized element on a glass material architecture. For the purpose of simplicity, the example described in association with FIGS. 3A-3C is limited to a particular metamaterial class of lithographically etched-grown features.

In FIG. 3A, an anisotropic metamaterial, with correct design, is able to impose conjugate phases on polarizations parallel (Pol 1) and perpendicular (Pol 2) to a non-planar surface 304 (e.g., defined by a series of grooves) of optical transformation element 106. Here, although a substrate 302 of optical transformation element 106 is both planar and can be made sufficiently thick to adhere (e.g., splice) to a GRIN element 104, non-planar surface 304 of optical transformation element 106 is not flat (i.e., non-planar), and may be relatively thin (e.g., on the order of tens of nanometers).

In some implementations, as shown in FIG. 3B, a top surface of optical transformation element 106 can be planarized by forming a planarization layer 306 on non-planar surface 304. In some implementations, the top surface of optical transformation element 106 can be planarized with, for example, a micron-scale layer of silica and a subsequent planarization process. However, in some cases, the planarization process may leave planarization layer 306 to be relatively thin with delicate features that could be damaged by heat introduced during a splice process.

Thus, as shown in FIG. 3C, bulk optical material 308 (e.g., fused silica, doped fused silica, another type of glass, or the like) can be adhered (e.g., wafer bonded) to planarization layer 306. Here, the adherence of bulk optical material 308 may provide sufficient thickness on the top surface of optical transformation element 106 such that splicing can be performed without damage to the structure of optical transformation element 106. In some implementations, adhering bulk optical material 308 to planarization layer 306 can be performed at the wafer scale, requiring no precise alignment. In some implementations, adhering bulk optical material 308 to planarization layer 306 can be performed using diffusion bonding, chemically-activated bonding, or the like. In some implementations, after adhering bulk optical material 308 to planarization layer 306, the combined wafer could be singulated to size (e.g., on the order of 1 millimeter), yielding many usable parts per wafer.

In some implementations, a GRIN element 104 may be adhered to optical transformation element 106. For example, a first GRIN element 104 may be fiber spliced to a bottom surface of substrate 302, and a second GRIN element 104 may be fiber spliced to a top surface of bulk optical material 308. In some implementations, rather than fiber spliced, one or more GRIN elements 104 may be diffusion bonded or chemically-activated-bonded to substrate 302 or to the top surface of bulk optical material 308.

As indicated above, FIGS. 3A-3C are provided as examples. Other examples may differ from what is described with respect to FIGS. 3A-3C.

In some implementations, as noted above, optical transformation element 106 may be birefringent such that orthogonal polarizations of beam 150 experience distinct transformations. For example, optical transformation element 106 may comprise an anisotropic metamaterial as a Pancharatnam-Berry phase element. Such materials are capable of making a circular polarization beam splitter in which one circular polarization (e.g., right-circularly polarized (RCP)) is directed at an angle A with respect to a normal vector of optical transformation element 106, and the opposite circular polarization (e.g., left-circularly polarized (LCP)) is directed at an angle of −A (e.g., a linearly polarized beam would be split in half, with 50% deflecting at angle A and 50% at angle −A). Thus, in some implementations, optical transformation element 106 can be used to enable an optical device to provide polarization-based beam routing of beam 150.

Figure 4A:
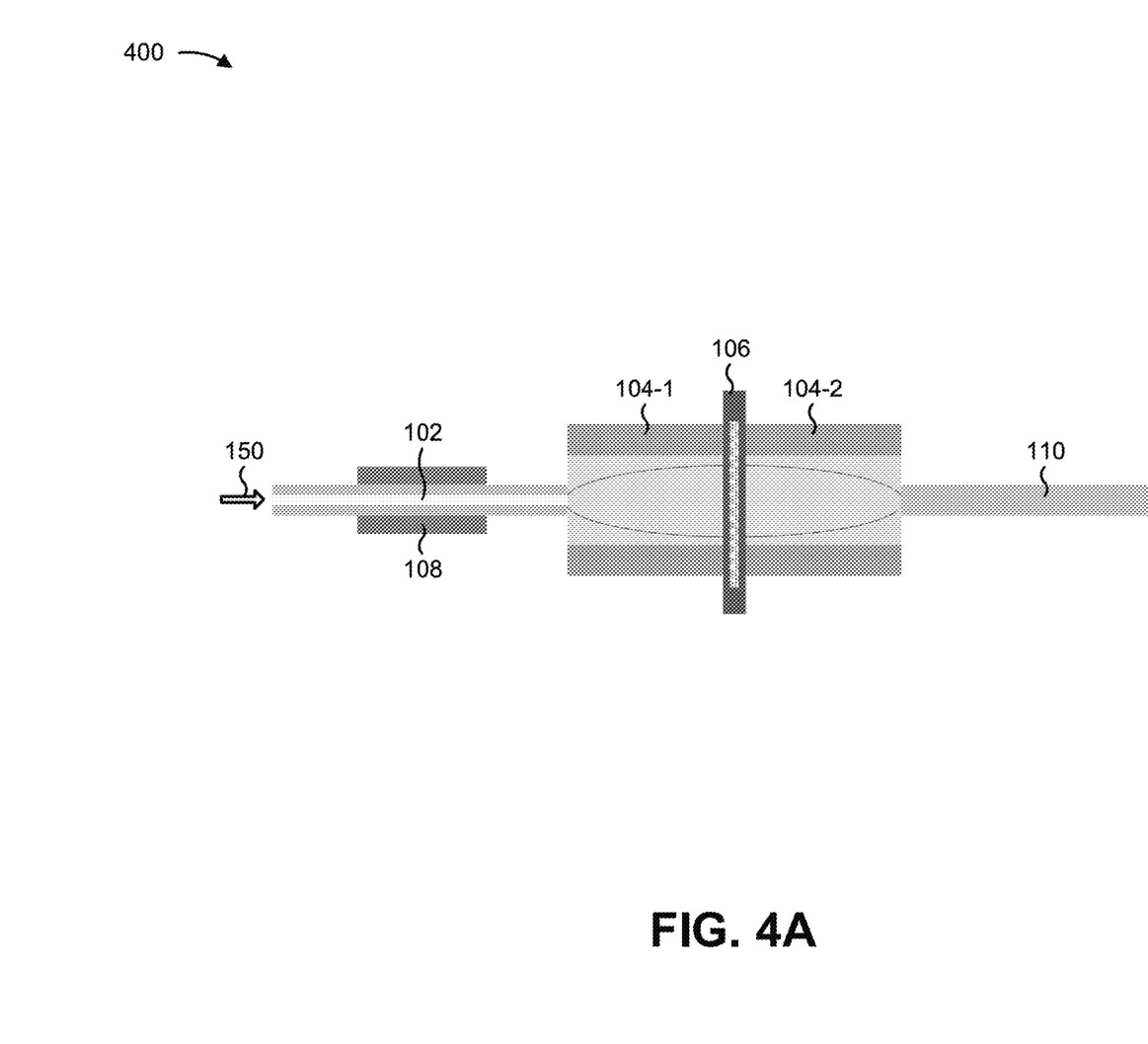
FIGS. 4A and 4B are diagrams associated with an example optical device that includes an optical transformation element that enables polarization-based beam routing of a polarized light source.
Figure 4B:
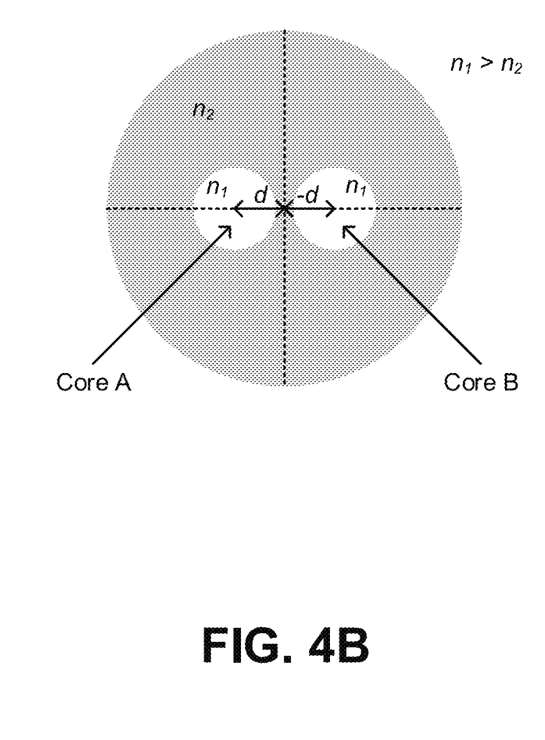

FIGS. 4A and 4B are diagrams associated with an example optical device 400 that includes an optical transformation element 106 that enables polarization-based beam routing of a polarized light source. As shown in FIG. 4A, optical device 400 may include a fiber 102, a first GRIN element 104 (e.g., GRIN element 104-1), an optical transformation element 106, and a second GRIN element 104 (e.g., GRIN element 104-2) to manipulate beam 150 after beam 150 is transformed by optical transformation element 106. Here, optical transformation element 106 is birefringent such that orthogonal polarizations of beam 150 experience distinct transformations. As further shown, optical device 400 may further include a polarization switch 108 (e.g., a bend- or twist-based polarization controller) to manipulate a polarization of beam 150 in fiber 102, and a multi-core fiber 110 (which may be a multi-core fiber, a multi-concentric core fiber, a fiber with multiple guiding inclusions, or the like) associated with components of outputting beam 150. As shown, in some implementations, an input facet of multi-core fiber 110 may be adhered to an output facet of the second GRIN element 104.

In operation of optical device 400, beam 150 leaving fiber 102 is Fourier transformed and expanded using the first GRIN element 104 (e.g., a first quarter-pitch GRIN fiber), before passing through optical transformation element 106 (e.g., a metamaterial RCP/LCP beam splitter). Here, optical transformation element 106 splits beam 150 into an RCP component and an LCP component. The RCP component and the LCP component of beam 150 then pass through the second GRIN element 104 (e.g., a second quarter-pitch GRIN fiber), which may be of different focal length than the first GRIN element 104, as noted above. Here, because the Fourier transform of a tilt is a displacement, after passing through the second GRIN element 104, the RCP component of beam 150 will be spatially offset by a distance d (which depends on a focal length of the second GRIN element 104 and the design of optical transformation element 106). The LCP component will be displaced by a distance –d. In this example, as illustrated in FIG. 4B, multi-core fiber 110 is a two-core fiber in which centers of each core are displaced from a fiber central axis by the same distance in opposing directions. For example, a first core (e.g., core A) of multi-core fiber 110 is centered at the distance d from the central axis and a second core (e.g., core B) of multi-core fiber 110 is centered at the distance –d from the central axis. Thus, the RCP component of beam 150 can be coupled into core A, while the LCP component of beam 150 can be coupled into core B. Here, when a light source is polarized, and polarization can be manipulated by polarization switch 108, then the optical power of beam 150 can be controllably directed to core A or core B of multi-core fiber 110.

The number and arrangement of elements shown in FIGS. 4A and 4B are provided as examples. In practice, optical device 400 may include additional elements, fewer elements, different elements, or differently arranged elements than those shown in FIGS. 4A and 4B. Additionally, or alternatively, a set of elements (e.g., one or more elements) of optical device 400 may perform one or more functions described as being performed by another set of elements of optical device 400.

Figure 5A:
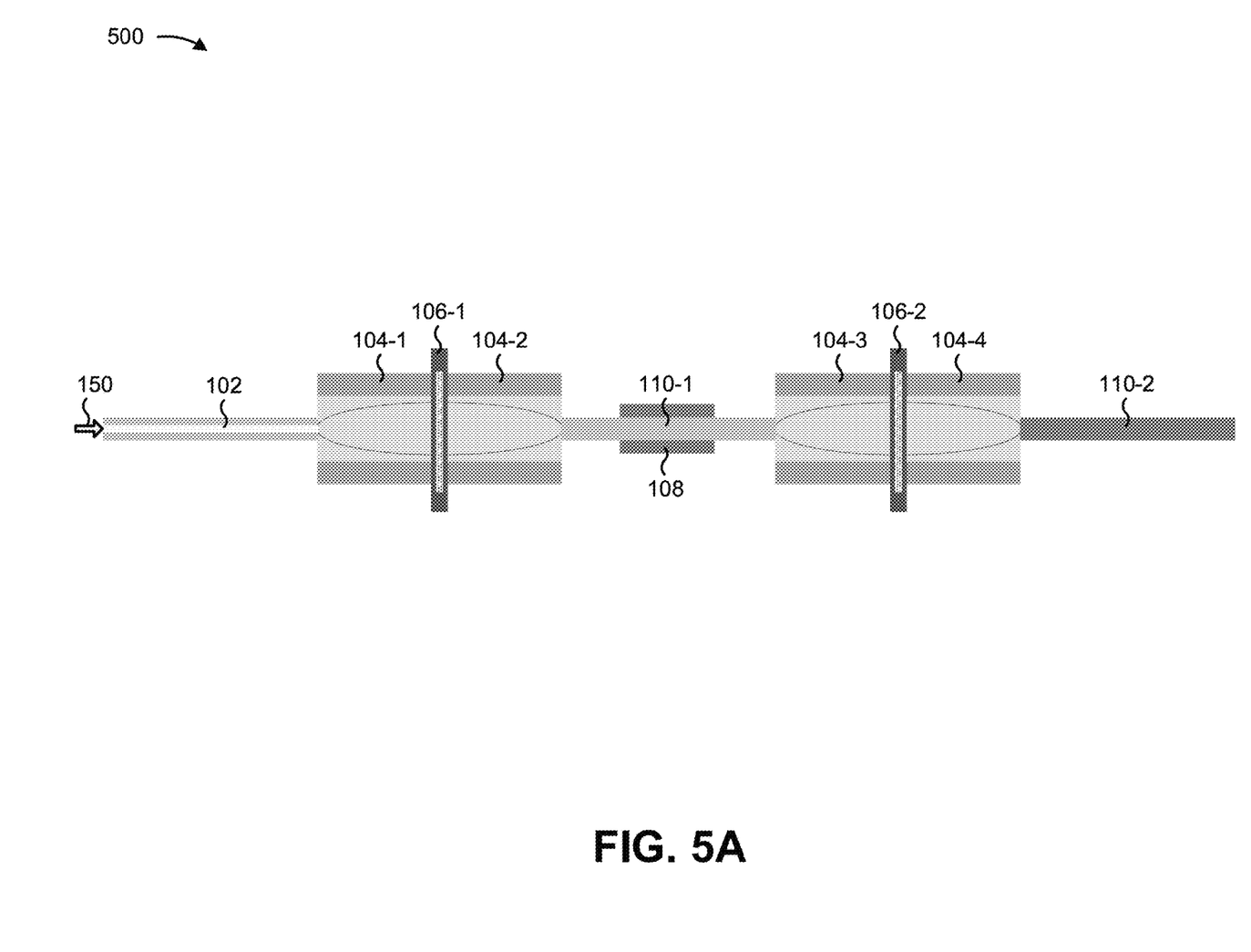
FIGS. 5A and 5B are diagrams associated with an example optical device that includes an optical transformation element that enables polarization-based beam routing of an unpolarized light source.
Figure 5B:
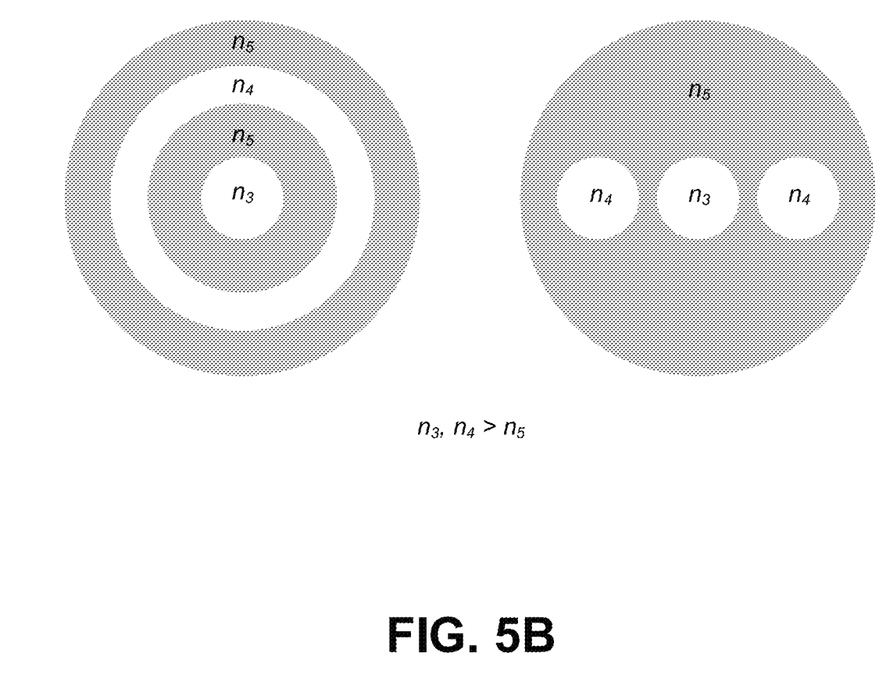

In some implementations, a polarization switch similar to that provided by optical device 400 can be provided even when a light source is unpolarized. FIGS. 5A and 5B are diagrams associated with an example optical device 500 that includes an optical transformation element 106 that enables polarization-based beam routing of an unpolarized light source. As shown in FIG. 5A, optical device 400 may include a fiber 102, a first GRIN element 104 (e.g., GRIN element 104-1), a first optical transformation element 106 (e.g., optical transformation element 106-1), and a second GRIN element (e.g., GRIN element 104-2) to manipulate beam 150 after beam 150 is transformed by the first optical transformation element 106. As further shown, optical device 500 may include a first multi-core fiber 110 (e.g., multi-core fiber 110-1), and a polarization switch 108 to manipulate a polarization of beam 150 in the first multi-core fiber 110. In some implementations, an input facet of the first multi-core fiber 110 may be adhered to an output facet of the second GRIN element 104.

As further shown, optical device 500 may include a third GRIN element 104 (e.g., GRIN element 104-3), a second optical transformation element 106 (e.g., optical transformation element 106-2), and a fourth GRIN element (e.g., GRIN element 104-4) to manipulate beam 150 after beam 150 is transformed by the second optical transformation element 106. In some implementations, an input facet of the third GRIN element 104 may be adhered to an output facet of the first multi-core fiber 110. In some implementations, an input facet of the second optical transformation element 106 may be adhered to an output facet of the third GRIN element 104. In some implementations, the second optical transformation element 106 may be birefringent such that orthogonal polarizations of beam 150 experience distinct transformations at the second optical transformation element 106. In some implementations, an input facet of the fourth GRIN element 104 may be adhered to an output facet of the second optical transformation element 106.

As further shown, optical device 500 may include a second multi-core or other multi-guiding region fiber 110. In some implementations, an input facet of the second multi-core fiber 110 may be adhered to an output facet of the fourth GRIN element 104.

In operation, beam 150 provided by fiber 102 is Fourier transformed with the first GRIN element 104, experiences an LCP/RCP metamaterial beam splitter at optical transformation element 106, and is coupled by the second GRIN element 104 into a multi-core fiber 110 (e.g., a two core fiber) in a manner similar to that described in association with FIGS. 4A and 4B. In optical device 500, the first multi-core fiber 110 is put through polarization switch 108. Here, polarization switch 108 may be a pressure based polarization controller where an axis of compression is perpendicular to a line joining the two cores of multi-core fiber 110, and in which pressure is either (1) applied in the appropriate amount to flip RCP to LCP, and vice versa (in the two cores, simultaneously), or (2) no pressure is applied, and the polarizations in the two cores are left unchanged. The output of multi-core fiber 110 is sent into a second GRIN-splitter-GRIN apparatus (e.g., comprising the third GRIN element 104, the second optical transformation element 106, and the fourth GRIN element 104). An output of the fourth GRIN element 104 may be coupled into the second multi-core fiber 110. The second multi-core fiber 110 may in some implementations be a fiber with multiple guiding regions or a multi-rotary fiber. Examples of possible cross sections of the second multi-core fiber 110 are shown in FIG. 5B. In some implementations, if the polarizations are not switched in optical device 500, each polarization receives an offset in the same direction as the first offset, and at the end of the fourth GRIN element 104, the RCP component of beam 150 is shifted by a distance of 2d and the LCP component is shifted by a distance of –2d, whereby both polarizations couple into fiber core(s) centered at distance 2d off a central axis of the second multi-core fiber 110 (e.g., cores labeled $n_4$ in FIG. 5B). Conversely, if the polarizations are switched in optical device 500, the shifts introduced by the second GRIN-splitter-GRIN apparatus cancel those induced by the first GRIN-splitter-GRIN apparatus (e.g., comprising the first GRIN element 104, the first optical transformation element 106, and the second GRIN element 104). Here, both the LCP and RCP components are brought back on axis, whereby both components couple into a central core of the second multi-core fiber 110 (e.g., cores labeled $n_3$ in FIG. 5B). In this way, an optical device including one or more optical transformation elements 106 can enable an all-in-fiber beam steering with minimal moving parts (e.g., for a polarized source using optical device 400, or for an unpolarized source using optical device 500).

The number and arrangement of elements shown in FIGS. 5A and 5B are provided as examples. In practice, optical device 500 may include additional elements, fewer elements, different elements, or differently arranged elements than those shown in FIGS. 5A and 5B. Additionally, or alternatively, a set of elements (e.g., one or more elements) of optical device 500 may perform one or more functions described as being performed by another set of elements of optical device 500.

Figure 6:
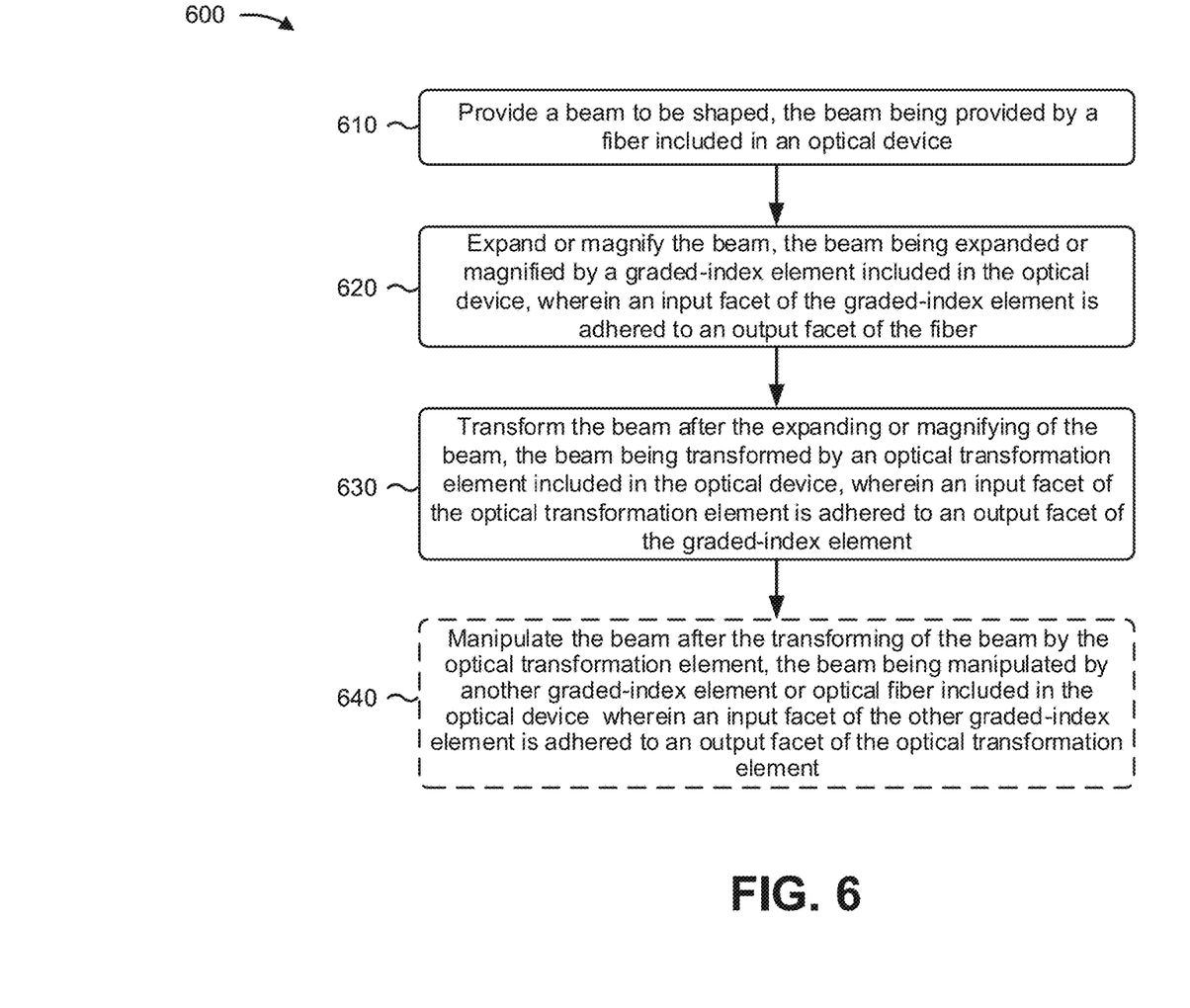
FIG. 6 is a flowchart of an example process for transforming a beam using an optical transformation element of an optical device after the beam is expanded or magnified by a graded-index element of the optical device, as described herein.

FIG. 6 is a flowchart of an example process 600 for transforming a beam using an optical transformation element of an optical device after the beam is expanded or magnified by a GRIN element of the optical device, as described herein.

As shown in FIG. 6, process 600 may include providing a beam to be transformed, the beam being provided by a fiber included in an optical device (block 610). For example, a beam (e.g., beam 150) may be provided by a fiber (e.g., fiber 102) of an optical device (e.g., optical device 100, optical device 120, optical device 200, optical device 220, optical device 400, optical device 500, or the like), as described above.

As further shown in FIG. 6, process 600 may include expanding or magnifying the beam, the beam being expanded or magnified by a graded-index element included in the optical device (block 620). For example, the beam may be expanded or magnified by a graded-index element (e.g., GRIN element 104) included in the optical device, as described above. In some implementations, input facet of the graded-index element is adhered to an output facet of the fiber.

As further shown in FIG. 6, process 600 may include transforming the beam after the expanding or magnifying of the beam, the beam being transformed by an optical transformation element included in the optical device (block 630). For example, the beam may be transformed by an optical transformation element (e.g., optical transformation element 106) included in the optical device after the expanding or the magnifying of the beam, as described above. In some implementations, an input facet of the optical transformation element is adhered to an output facet of the graded-index element.

As further shown in FIG. 6, process 600 may optionally include manipulating the beam after the transforming of the beam by the optical transformation element, the beam being manipulated by another graded-index element included in the optical device (block 640). For example, the beam may be manipulated by another graded-index element (e.g., a second GRIN element 104) or optical fiber included in the optical device after the transforming of the beam by the optical transformation element, as described above. In some implementations, an input facet of the other graded-index element or optical fiber may be adhered to an output facet of the optical transformation element. In some implementations, the manipulating of the beam may include resizing the beam (e.g., into a delivery fiber).

Process 600 may include additional implementations, such as any single implementation or any combination of implementations described below and/or in connection with one or more other processes described elsewhere herein.

In some implementations, the graded-index element includes a quarter-pitch graded-index fiber, wherein the output facet of the graded-index element is an output facet of the quarter-pitch graded-index fiber.

In some implementations, the graded-index element includes a graded-index telescope comprising a first quarter-pitch graded-index fiber and a second quarter-pitch graded-index fiber, wherein the output facet of the graded-index element is an output facet of the graded-index telescope.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide an optical device (e.g., optical device 100, optical device 120, optical device 200, optical device 220, optical device 400, optical device 500, or the like) that includes one or more GRIN elements 104 and one or more optical transformation elements 106, where the one or more optical transformation elements 106 are spliced or otherwise bonded onto the GRIN elements 104. In some implementations, use of GRIN elements 104 in conjunction with one or more optical transformation elements 106 enables the optical device to provide tailoring of the near and/or far fields of a fiber 102. Implementations described herein enable a wide range of possible beam shapes/beam shaping optics in an all-fiber system. Further, implementations described herein allow optical transformation elements 106 to be introduced into an optical fiber system without allowing beam 150 to enter free-space. Additionally, implementations described herein enable in-fiber polarization switching/routing in, for example, a multimode system.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. An optical device, comprising:
a fiber to provide a beam;
a graded-index element to expand or magnify the beam,
wherein an input facet of the graded-index element is adhered to an output facet of the fiber; and
an optical transformation element to transform the beam after the beam is expanded or magnified by the graded-index element,
wherein an input facet of the optical transformation element is adhered to an output facet of the graded-index element, and
wherein the optical transformation element is birefringent such that orthogonal polarizations of the beam experience distinct phase transformations.

2. The optical device of claim 1, wherein the graded-index element is a first graded-index element, and wherein the optical device further comprises:
a second graded-index element to manipulate the beam after the beam is transformed by the optical transformation element,
wherein an input facet of the second graded-index element is adhered to an output facet of the optical transformation element.

3. The optical device of claim 2, wherein the optical transformation element is a first optical transformation element, and wherein the optical device further comprises:
a second optical transformation element to transform the beam after the beam is manipulated by the second graded-index element,
wherein an input facet of the second optical transformation element is adhered to an output facet of the second graded-index element.

4. The optical device of claim 2, wherein the optical device further comprises:
a polarization switch to manipulate a polarization of the beam in the fiber; and
a multi-core fiber associated with outputting the beam, an input facet of the multi-core fiber being adhered to an output facet of the second graded-index element.

5. The optical device of claim 2, wherein the optical transformation element is a first optical transformation element, and wherein the optical device further comprises:
a first multi-core fiber, an input facet of the first multi-core fiber being adhered to an output facet of the second graded-index element;
a polarization switch to manipulate a polarization of the beam in the first multi-core fiber;
a third graded-index element, an input facet of the third graded-index element being adhered to an output facet of the first multi-core fiber;
a second optical transformation element, an input facet of the second optical transformation element being adhered to an output facet of the third graded-index element,
wherein the second optical transformation element is birefringent such that orthogonal polarizations of the beam experience distinct transformations;
a fourth graded-index element, an input facet of the fourth graded-index element being adhered to an output facet of the second optical transformation element; and
a second multi-core fiber, an input facet of the second multi-core fiber being adhered to an output facet of the fourth graded-index element.

6. An optical system, comprising:
an optical fiber device, including:
a set of graded-index fibers associated with expanding or magnifying a beam provided by an input fiber,
wherein an input facet of a first graded-index fiber, of the set of graded-index fibers, is adhered to an output facet of the input fiber; and
an optical transformation element associated with transforming the beam after expanding or magnifying by the first graded-index fiber,
wherein an input facet of the optical transformation element is adhered to an output facet of a particular graded-index fiber of the set of graded-index fibers, and
wherein the optical transformation element is birefringent such that orthogonal polarizations of the beam experience distinct phase transformations.

7. The optical system of claim 6, wherein the set of graded-index fibers includes a second graded-index fiber,
wherein an input facet of the second graded-index fiber is adhered to an output facet of the optical transformation element.

8. The optical system of claim 7, wherein the optical transformation element is a first optical transformation element, and wherein the optical fiber device further comprises:
a second optical transformation element,
wherein an input facet of the second optical transformation element is adhered to an output facet of the second graded-index fiber.

9. The optical system of claim 7, wherein the optical fiber device further comprises:
a polarization switch to manipulate a polarization of the beam in the input fiber; and
a multi-core fiber, an input facet of the multi-core fiber being adhered to an output facet of the second graded-index fiber.

10. The optical system of claim 7, wherein the optical transformation element is a first optical transformation element and the set of graded-index fibers includes a third graded-index fiber and a fourth graded-index fiber, and wherein the optical fiber device further comprises:
a first multi-core fiber, an input facet of the first multi-core fiber being adhered to an output facet of the second graded-index fiber;
a polarization switch to manipulate a polarization of the beam in the first multi-core fiber;
the third graded-index fiber, an input facet of the third graded-index fiber being adhered to an output facet of the first multi-core fiber;
a second optical transformation element, an input facet of the second optical transformation element being adhered to an output facet of the third graded-index fiber,
wherein the second optical transformation element is birefringent such that orthogonal polarizations of the beam experience distinct transformations;
the fourth graded-index fiber, an input facet of the fourth graded-index fiber being adhered to an output facet of the second optical transformation element; and
a second multi-core fiber, an input facet of the second multi-core fiber being adhered to an output facet of the fourth graded-index fiber.

11. A method comprising:
providing a beam to be transformed, the beam being provided by a fiber included in an optical device,
expanding or magnifying the beam, the beam being expanded or magnified by a graded-index element included in the optical device, wherein an input facet of the graded-index element is adhered to an output facet of the fiber; and transforming the beam after the expanding or magnifying of the beam, the beam being transformed by an optical transformation element included in the optical device, wherein an input facet of the optical transformation element is adhered to an output facet of the graded-index element, and wherein the optical transformation element is birefringent such that orthogonal polarizations of the beam experience distinct phase transformations.

12. The method of claim 11, wherein the graded-index element is a first graded-index element, and wherein the method further comprises:

manipulating, by a second graded-index element, the beam after the transforming of the beam by the optical transformation element, wherein an input facet of the second graded-index element is adhered to an output facet of the optical transformation element.

13. The optical device of claim 1, wherein the optical transformation element comprises an anisotropic metamaterial.

14. The optical device of claim 1, wherein the optical transformation element is a Pancharatnam-Berry phase element.

15. The optical system of claim 6, wherein the optical transformation element comprises an anisotropic metamaterial.

16. The optical system of claim 6, wherein the optical transformation element is a Pancharatnam-Berry phase element.

17. The method of claim 11, wherein the optical transformation element comprises an anisotropic metamaterial.

18. The method of claim 11, wherein the optical transformation element is a Pancharatnam-Berry phase element.

19. The method of claim 12, wherein the optical transformation element is a first optical transformation element, and wherein the method further comprises:

transforming the beam after the beam is manipulated by the second graded-index element, the beam being transformed by a second optical transformation element included in the optical device, wherein an input facet of the second optical transformation element is adhered to an output facet of the second graded-index element.

20. The method of claim 12, wherein the method further comprises:

manipulating a polarization of the beam in the fiber, the polarization of the beam being manipulated by a polarization switch included in the optical device; and outputting the beam via a multi-core fiber, wherein an input facet of the multi-core fiber is adhered to an output facet of the second graded-index element.

* * * * *